US012713486B2

(12) United States Patent
Kumar et al.

(10) Patent No.: US 12,713,486 B2
(45) Date of Patent: Aug. 18, 2026

(54) METHOD AND UE FOR PERFORMING PDU SESSION RECOVERY IN RRC INACTIVE STATE OF UE

(71) Applicant: Samsung Electronics Co., Ltd., Suwon-si (KR)

(72) Inventors: Lalith Kumar, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 18/289,681

(22) PCT Filed: May 9, 2022

(86) PCT No.: PCT/KR2022/006573

§ 371 (c)(1), (2) Date: Nov. 6, 2023

(87) PCT Pub. No.: WO2022/235133

PCT Pub. Date: Nov. 10, 2022

(65) Prior Publication Data

US 2024/0251467 A1 Jul. 25, 2024

(30) Foreign Application Priority Data

May 7, 2021 (IN) ............................. 202141020869
Apr. 6, 2022 (IN) ............................. 202141020869

(51) Int. Cl.
*H04W 76/19* (2018.01)
*H04W 76/27* (2018.01)

(52) U.S. Cl.
CPC ........... *H04W 76/19* (2018.02); *H04W 76/27* (2018.02)

(58) Field of Classification Search
CPC ............................. H04W 76/19; H04W 76/27
See application file for complete search history.

(56) References Cited

U.S. PATENT DOCUMENTS 10,548,000 B2 * 1/2020 Jain ........................ H04W 28/02
10,694,365 B2 6/2020 Lee et al.
(Continued)

FOREIGN PATENT DOCUMENTS

KR 10-2018-0137823 A 12/2018
TW 1696406 B 6/2020
(Continued)

OTHER PUBLICATIONS

Xiong, Chunshan WO 2022206252 Feb. 28, 2022 (Year: 2022).*
3GPP TS 24.501 vi7.2.1, Apr. 2021 (Note: this NRL file was attached by applicant in the application) (Year: 2021).*
3rd Generation Partnership Project; Technical Specification Group Core Network and Terminals; Non-Access-Stratum (NAS) protocol for 5G System (5GS); Stage 3; (Release 17), 3GPP TS 24.501 V17.2.1, Apr. 9, 2021.
(Continued)

*Primary Examiner* — Zaihan Jiang
(74) *Attorney, Agent, or Firm* — Jefferson IP Law, LLP

(57) ABSTRACT

The disclosure relates to a 5G or 6G communication system for supporting a higher data transmission rate. Embodiments herein disclose methods for performing PDU session recovery in a RRC inactive state of a UE (100) by the UE (100). The method includes initiating a NAS message in the RRC inactive state of the UE (100). Further, the method includes receiving a fallback indication from a lower layer and determining whether the UE (100) included an indication in the NAS message. In an embodiment, the method includes initiating recovery of the PDU session for which at least one user-plane resource was active prior to receiving the fallback indication upon determining that the UE (100) does not include the indication in the NAS message. In another embodiment, the method includes forbidding to initiate recovery of the PDU session for which at least one user-plane resource was active prior to receiving the fallback indication upon determining that the UE (100) included the indication in the message.

12 Claims, 6 Drawing Sheets

(56) References Cited

U.S. PATENT DOCUMENTS

| | | | | |
|---|---|---|---|---|
| 10,813,161 | B2 | 10/2020 | Moisanen et al. | |
| 2015/0189689 | A1* | 7/2015 | Wang | H04W 4/70 370/329 |
| 2019/0239280 | A1 | 8/2019 | Li et al. | |
| 2019/0289571 | A1* | 9/2019 | Park | H04W 60/00 |
| 2020/0187088 | A1 | 6/2020 | Chun et al. | |
| 2020/0323020 | A1* | 10/2020 | Liu | H04W 80/10 |
| 2020/0404551 | A1 | 12/2020 | Wang | |
| 2022/0124838 | A1 | 4/2022 | Lin et al. | |
| 2022/0264506 | A1* | 8/2022 | Kiss | H04W 68/02 |
| 2022/0272660 | A1* | 8/2022 | Luetzenkirchen | H04W 76/30 |
| 2022/0322481 | A1* | 10/2022 | Kumar | H04W 76/15 |
| 2022/0330376 | A1* | 10/2022 | Sabouri-Sichani | H04W 48/18 |
| 2022/0346060 | A1* | 10/2022 | Kumar | H04W 68/005 |
| 2023/0087650 | A1* | 3/2023 | Watfa | H04W 8/183 370/329 |
| 2023/0254762 | A1* | 8/2023 | Kumar | H04W 48/14 455/404.1 |
| 2023/0327748 | A1* | 10/2023 | Rommer | H04W 36/083 370/316 |

FOREIGN PATENT DOCUMENTS

| | | | |
|---|---|---|---|
| WO | WO-2021069431 | * | 10/2020 |
| WO | WO-2022206252 | * | 2/2022 |

OTHER PUBLICATIONS

3rd Generation Partnership Project; Technical Specification Group Core Network and Terminals; Non-Access-Stratum (NAS) protocol for 5G System (5GS); Stage 3; (Release 17), 3GPP TS 24.501 V17.6.0, Mar. 24, 2022.

Samsung, Uplink data status IE not included when requesting release, 3GPP TSG-CT WG1 Meeting #134-e, C1-221907, Feb. 24, 2022.

Indian Office Action dated Dec. 1, 2022, issued in Indian Patent Application No. 202141020869.

Indian Hearing Notice dated May 25, 2026; Indian Appln. No. 202141020869.

* cited by examiner

FIG. 1

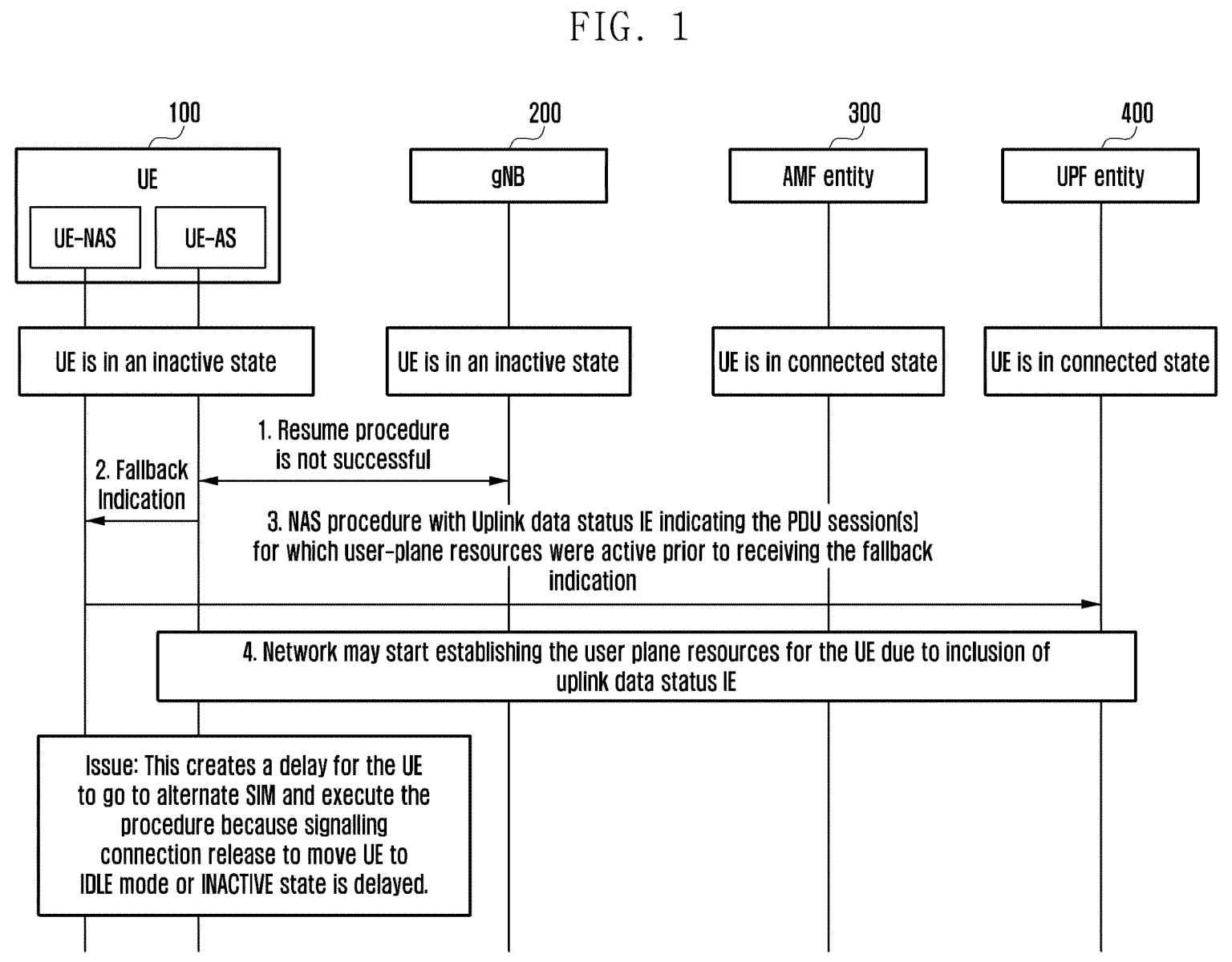

100 UE
UE-NAS
UE-AS
200 gNB
300 AMF entity
400 UPF entity

UE is in an inactive state
UE is in an inactive state
UE is in connected state
UE is in connected state 1. Resume procedure is not successful 2. Fallback Indication 3. NAS procedure with Uplink data status IE indicating the PDU session(s) for which user-plane resources were active prior to receiving the fallback indication 4. Network may start establishing the user plane resources for the UE due to inclusion of uplink data status IE Issue: This creates a delay for the UE to go to alternate SIM and execute the procedure because signalling connection release to move UE to IDLE mode or INACTIVE state is delayed.

METHOD AND UE FOR PERFORMING PDU SESSION RECOVERY IN RRC INACTIVE STATE OF UE

TECHNICAL FIELD

Embodiments disclosed herein relate to wireless communication networks, and more particularly to methods and an User Equipment (UE) for performing protocol data unit (PDU) session recovery in a radio resource control (RRC) inactive state of a User Equipment (UE) in the wireless communication networks.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

Connection release: while accessing a core network, the Multi-USIM UE may request the network to be released from a CM-CONNECTED state due to activity on another USIM. The UE indicates that it requests to be released from the CM-CONNECTED state, by initiating either a service request procedure or a registration procedure including a release indication. The UE of the MUSIM UE, sends NAS message to the network by including a release request flag to indicate to the network that it wants to release the signalling connection and get into either INACTIVE state or IDLE state so that the UE can initiate operation on the second SIM. The UE expects this step to be executed as quickly as possible so that it can start the service on the second SIM. Any delay in this step will cause delay in initiating service or missing the service on second SIM for example if there is a mobile terminated call to the second SIM (this term interchangeably used with USIM in this embodiment), first SIM UE which is in connected mode with network initiates the connection release procedure so it can be released to IDLE or INACTIVE state and thereafter second SIM UE can take the mobile terminated call but if there is a delay in releasing from the network the second SIM may miss the incoming call from the network. Which will lead for call drop for the user impacting the services.

FIG. 1 is a flow diagram depicting the process of inactive state handling for leaving and busy procedures (e.g., paging reject procedure), according to prior arts. At 1, when the UE (100) triggers the resume procedure (for example, due to the RNA update procedure or UE wants to trigger a connection release procedure i.e. Service request message with Release request indication), the resume procedure (the procedure initiated by triggering RRC message to move from the INACTIVE state to the Connected state) may fail (because for example, the RAN node may not have the UE context; or the target RAN node may not be able to fetch the UE context from source RAN node; or due to some other network failure etc). At 2, due to failure of resume procedure, the UE's access stratum will indicate the same to the UE's NAS with resume failure indication or fallback indication. At 3, whenever these indications are received, the UE (100) triggers the NAS recovery procedure. As part of the NAS recovery procedure, the UE (100) indicates the PDU session(s) for which user-plane resources were active prior to receiving the fallback indication using uplink data status IE. At 4, the network may start performing recovery of the PDU session(s) for which user-plane resources were active prior to receiving the fallback indication. This creates a delay for the UE (100) to go to alternate SIM and execute the procedure or service on the alternate or second SIM, because signalling connection release to move UE (100) to IDLE mode or INACTIVE state is delayed. The resume failure in this example is called for a situation when the UE (100) has sent the RRC message like RRCResumeRequest but UE (100) could not be transitioned from RRC Inactive state to RRC Connected state (also 5GMM-Connected state).

It is desired to address the above mentioned disadvantages or other short comings or at least provide a useful alternative.

DISCLOSURE OF INVENTION

Technical Problem

The principal object of the embodiments herein is to disclose methods and UE for performing PDU session recovery in a RRC inactive state of the UE in a wireless communication network.

Another object of the embodiments herein is to provide that, when a fallback indication is received at a NAS layer of the UE, a NAS layer of the UE does not start a recovery procedure of user plane resources of a PDU session which were active prior to receiving the fallback indication. As recovery procedure is avoided, the UE will quickly receive the release and UE can start the services on the alternate SIM as soon as possible.

Another object of the embodiments herein is to provide that the NAS layer of the UE will initiate the recovery procedure of the user plane resources for the PDU session which were active prior to receiving fallback indication if a leaving procedure is not initiated.

Solution to Problem

Accordingly, the embodiments herein provide methods for performing PDU session recovery in a RRC inactive state of a UE. The method includes initiating, by the UE, a NAS message in the RRC inactive state of the UE. Further, the method includes receiving, by the UE, a fallback indication from a lower layer. Further, the method includes determining, by the UE, whether the UE included an indication in the NAS message. In an embodiment, the method includes initiating recovery of the PDU session for which at least one user-plane resource was active prior to receiving the fallback indication upon determining that the UE does not include the indication in the NAS message. In another embodiment, the method includes forbidding to initiate recovery of the PDU session for which at least one user-plane resource was active prior to receiving the fallback indication upon determining that the UE included the indication in the NAS message.

In an embodiment, the indication includes at least one of a release request indication, a release indication, a paging reject indication and the UE request type information element (IE) with Request type value set to "NAS signalling connection release".

In an embodiment, the fallback indication is received from the lower layer, when a resume procedure of the UE is not successful with a network entity. The lower layer comprises an access stratum (AS) layer.

In an embodiment, initiating the recovery of the PDU session includes performing a NAS procedure with uplink data status IE indicating the at least one PDU session for which at least one user-plane resource was active prior to receiving the fallback indication.

Accordingly, the embodiments herein provide a UE for performing PDU session recovery in a RRC inactive state of the UE. The UE includes a NAS recovery procedure handling controller coupled with a processor and a memory. The NAS recovery procedure handling controller initiates a NAS message in the RRC Inactive state and receives a fallback indication from a lower layer. The NAS recovery procedure handling controller determines whether the UE included an indication in the NAS message. In an embodiment, the NAS recovery procedure handling controller initiates recovery of the PDU session for which at least one user-plane resource was active prior to receiving the fallback indication upon determining that the UE does not include the indication in the NAS message. In another embodiment, the NAS recovery procedure handling controller forbids to initiate recovery of the PDU session for which at least one user-plane resource was active prior to receiving the fallback indication upon determining that the UE included the indication in the NAS message.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

Advantageous Effects of Invention

In this way, in case that UE does not include release request indication, the UE does not start a recovery procedure of user plane resources of a PDU session which were active prior to receiving the fallback indication. Therefore, by avoiding initiation of a recovery procedure, delay of signaling connection release to move the UE to IDLE mode or INACTIVE state can be reduced.

BRIEF DESCRIPTION OF DRAWINGS

FIG. 1 is a flow diagram depicting the process of inactive state handling for leaving and busy procedures, according to prior arts;

MODE FOR THE INVENTION

Figure 2:
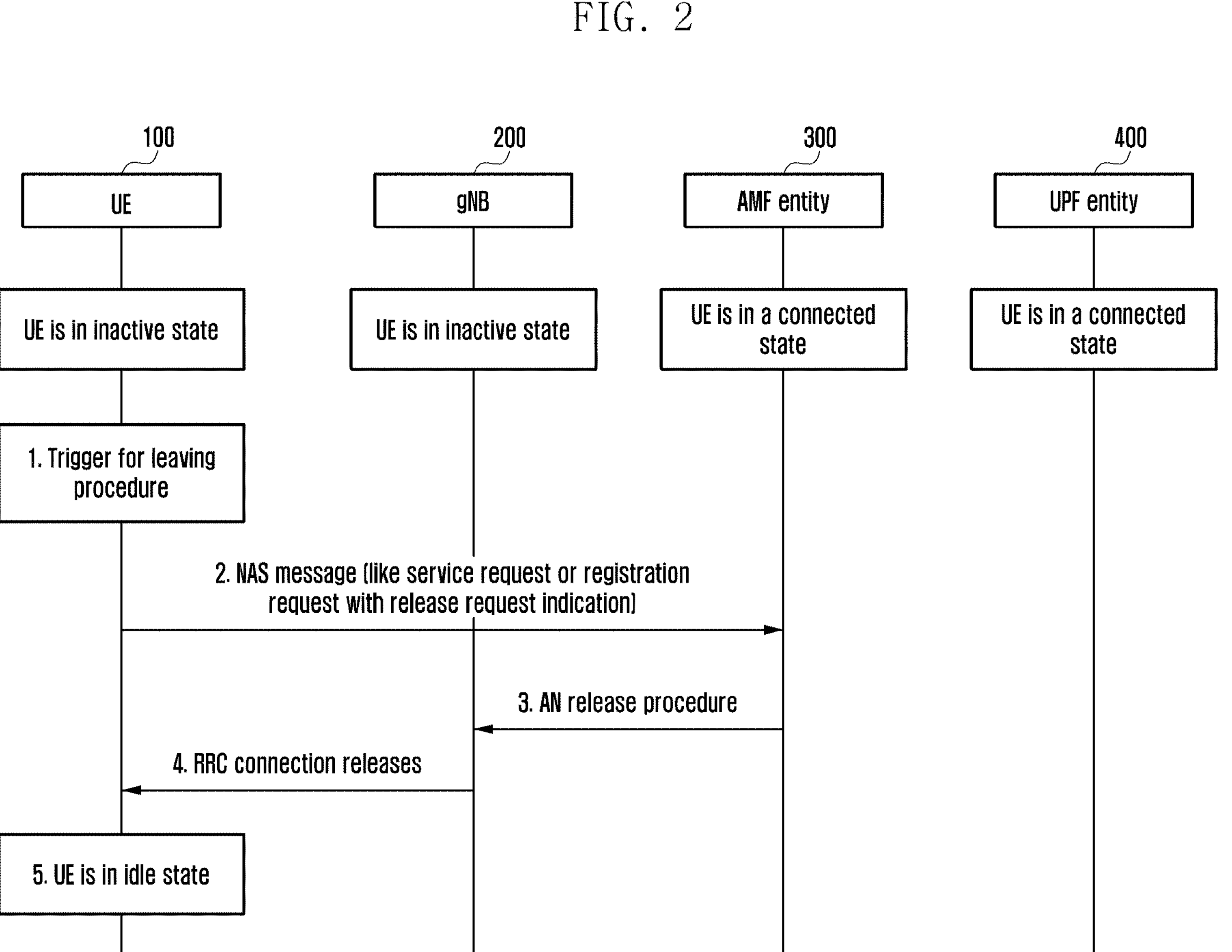
FIG. 2 is a flow diagram depicting the leaving procedure, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein refer to a Multi-USIM UE, which is a UE with multiple USIMs, capable of maintaining a separate registration state with a Public Land Mobile Network (PLMN) for each USIM at least over an 3rd Generation Partnership Project (3GPP) access.

The embodiments herein achieve methods for performing PDU session recovery in a RRC inactive state of a UE. The method includes initiating, by the UE, a NAS message in the RRC Inactive state of the UE. Further, the method includes receiving, by the UE, a fallback indication from a lower layer. Further, the method includes determining, by the UE, whether the UE included an indication in the NAS message. In an embodiment, the method includes initiating recovery of the PDU session for which at least one user-plane resource was active prior to receiving the fallback indication upon determining that the UE does not include the indication in the NAS message. In another embodiment, the method includes forbidding to initiate recovery of the PDU session for which at least one user-plane resource was active prior to receiving the fallback indication upon determining that the UE included the indication in the NAS message.

In an embodiment, when the fallback indication is received at a NAS layer of the UE, a NAS layer of the UE does not start the recovery procedure of user plane resources of the PDU session which were active prior to receiving the fallback indication. As recovery procedure is avoided, the UE will quickly receive the release and UE can start the services on the alternate SIM as soon as possible.

In another embodiment, the NAS will initiate the recovery procedure of the user plane resources for PDU session which were active prior to receiving fallback indication if a leaving procedure is not initiated.

Referring now to the drawings, and more particularly to FIGS. 2 through 6, where similar reference characters denote corresponding features consistently throughout the figures, there are shown at least one embodiment.

FIG. 2 is a flow diagram depicting a leaving procedure, according to embodiments as disclosed herein. As shown in the FIG. 2, at 1, the UE (100) triggers for the leaving procedure. At 2, the UE (100) sends the NAS message (like service request or registration request with release request indication) to the AMF entity (300). At 3, the AMF entity (300) sends the AN release procedure to the gNB (200). At 4, the gNB (200) sends the RRC connection releases to the UE (100). At 5, the UE (100) is in the idle state.

In an embodiment, whenever, the UE (100) is entering a situation where it is aware that it will not be able to respond to a RAN paging in an RRC INACTIVE state, as discussed for the example scenarios in the problem statement, another e.g., is if UE_1 of the MUSIM UE is in the inactive state the UE_2 is about to start the voice call UE_1 radio may stop listening to any paging from UE_1, in all such example cases, the UE (100) triggers the connection release procedure (also called as leaving procedure) so that the UE (100) can be moved to the IDLE state; i.e., the UE (100) is allowed to trigger leaving procedure from INACTIVE state.

In an embodiment herein, on reception of RAN level paging, the UE (100) triggers the connection release procedure (also called as leaving procedure). In another embodiment, when the NAS layer is informed that the UE (100) is transitioned from RRC Inactive state to 5GMM-Connected state, the UE (100) triggers the connection release procedure (also called as leaving procedure).

When the UE (100) in the 5GMM-CONNECTED mode with the RRC inactive indication receives the fallback indication from the lower layers, and the UE (100) has no pending NAS procedure and no pending uplink user data for PDU session(s) with user-plane resources already established, the UE (100) shall enter 5GMM-IDLE mode (optionally) and initiate the leaving procedure, if the UE (100) wants to remain in the IDLE state or the RRC Inactive state.

When the UE (100) in the 5GMM-CONNECTED mode with the RRC inactive indication receives the fallback indication from the lower layers, and the UE (100) has no pending NAS procedure and no pending uplink user data for PDU session(s) with user-plane resources already established, the UE (100) shall enter 5GMM-IDLE mode and will not initiate any NAS procedure, if the UE (100) wants to remain in the IDLE state or the RRC inactive state. When the UE (100) wants to receive service on the network, the UE (100) can initiate the NAS procedure; for e.g., by initiating the registration procedure for mobility and periodic registration update used for mobility (i.e. the 5GS registration type IE set to "mobility registration updating" in the REGISTRATION REQUEST message) for N1 NAS signalling connection recovery, as specified in 24.501.

In an embodiment, as part of the leaving procedure also called as connection release procedure, the UE (100) sends the NAS message for example Service request message (with leaving indication or release request indication or release Indication) or registration request message (with leaving indication or release request indication or release Indication) to indicate to the network that the UE (100) wants to leave the current network and wants to be released to IDLE state. The AMF entity (300) on reception of this NAS message should trigger an Access Network (AN) release procedure and move the UE (100) to CM-IDLE state.

In an embodiment, if the RAN level paging fails that in response to RAN paging, if the UE (100) does not send a response RRC message, the gNB (200) should release the N2 and N3 connection (also called as tunnels or interfaces). The UE (100) is moved to the IDLE state from the network perspective.

In an embodiment, if the RAN level paging fails that in response to the RAN paging, if the UE (100) does not send a response RRC message, the gNB (200) should release the N2 and N3 connection. The UE (100) is moved to the IDLE state from the network perspective only if the gNB (200) is aware that the UE (100) is MUSIM UE and supports one or more of the MUSIM features (such as, but not limited to, Connection release, Paging indication for voice service, Reject paging request, Paging Restriction, and so on).

In an embodiment, if the RAN node receives the busy indication or Paging reject indication in response to RAN paging, the gNB (200) should release the N2 and N3 connection. The UE (100) is moved to the IDLE state from the network perspective by executing RRC connection release procedure.

Figure 3:
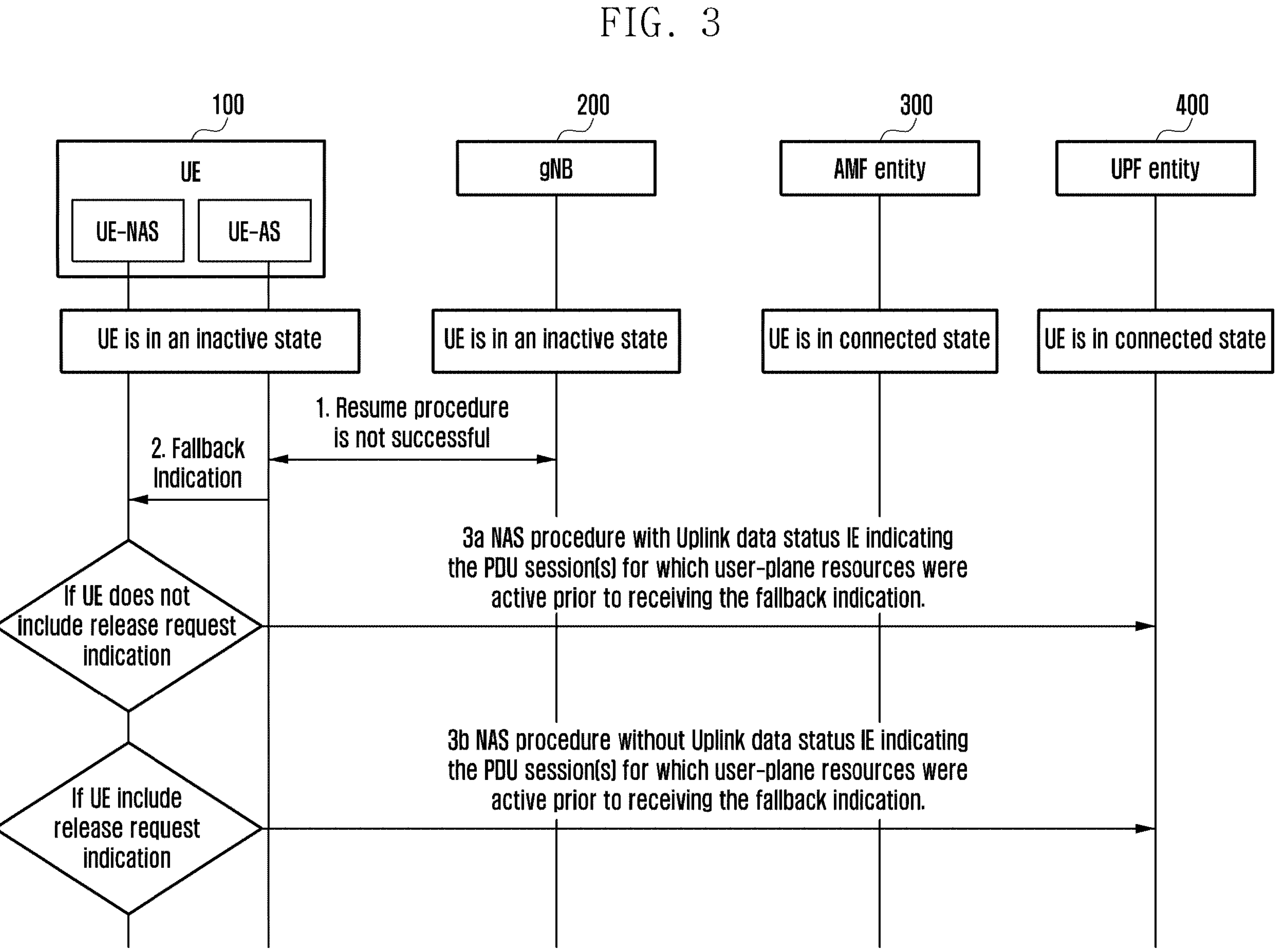
FIG. 3 is a flow diagram depicting a process of inactive state handling for leaving and busy procedures, according to embodiments as disclosed herein.

FIG. 3 is a flow diagram depicting the process of inactive state handling for leaving and busy procedures, according to embodiments as disclosed herein.

At 1, when the UE (100) triggers the resume procedure (for example, due to the RNA update procedure), the resume procedure may fail (because for example, the RAN node (200*b*) may not have the UE context; or the target RAN node may not be able to fetch the UE context from a source RAN node). At 2, due to failure of the resume procedure, the UE's access stratum will indicate the same to the UE's NAS with resume failure indication or fallback indication. Whenever these indications are received, the UE (100) triggers the NAS recovery procedure. As part of NAS recovery procedure in the NAS message:

If the UE (100) decides not to include the release request indication/release indication/Paging reject indication/UE request type information element (IE) with Request type value set to "NAS signalling connection release", the UE (100) includes the Uplink Data status IE with the PDU session(s) for which user-plane resources were active prior to receiving the fallback indication or to indicate PDU sessions for which uplink data is available at 3*a*.

If the UE (100) decides to include the release request indication/release request indication/Paging reject indication/UE request type information element (IE) with Request type value set to "NAS signalling connection release", to execute leaving or Paging reject procedure, the UE (100) does not include the Uplink Data status IE with the PDU session(s) for which the user-plane resources were active prior to receiving the fallback indication at 3*b*.

i.e., Upon receiving a fallback indication or resume failure indication from the lower layers, the UE-NAS layer, based on the information, decides whether to include uplink data status IE, This information can be the release indication/release request indication/paging reject indication/UE request type information element (IE) with Request type value set to "NAS signalling connection release". The information in general is the one which is used by the UE (100) during the leaving procedure (also called as connection release procedure) or paging reject/busy procedure to indicate to the network as part of the NAS message like registration request or service request that the UE (100) wants to enter IDLE state or INACTIVE state as quickly as possible.

In this embodiment the terms release indication/release request indication/paging reject indication/UE request type information element (IE) with Request type value set to "NAS signalling connection release" are used interchangeably and have same meaning in the context of this embodiment.

When the UE (100) in 5GMM-CONNECTED mode with RRC inactive indication receives the fallback indication from the lower layers, and the UE (100) has no pending NAS procedure and no pending uplink user data for PDU session(s) with user-plane resources already established, the UE (100) shall:

Enter 5GMM-IDLE mode (optionally); and

Initiate the NAS procedure for e.g., registration procedure for mobility and periodic registration update, further if the release request indication/release indication/Paging reject indication/leaving is not included in the NAS message e.g., registration request message then includes Uplink data status IE in the NAS message for e.g., REGISTRATION REQUEST message indicating the PDU session(s) for which user-plane resources were active prior to receiving the fallback indication, if any.

If the UE (100) requests the lower layers to transition to RRC_CONNECTED state at initiation of a registration procedure, a service request procedure or a de-registration procedure, upon fallback indication from lower layers, the UE (100) shall:

Enter 5GMM-IDLE mode;

proceed with the pending procedure; and if the pending procedure is a service request or registration request procedure, further if the release request indication/release indication/Paging reject indication/leaving is not included in the registration request message or service request message the UE (100) shall include the Uplink data status IE in the SERVICE REQUEST message, the CONTROL PLANE SERVICE REQUEST message or in the REGISTRATION REQUEST message, indicating the PDU session(s) without active user-plane resources for which the UE (100) has pending user data to be sent, if any, and the PDU session(s) for which user-plane resources were active prior to receiving the fallback indication, if any.

If the UE (100) requests the lower layers to transition to RRC_CONNECTED state for other reason than initiation of a registration procedure, or for other reason than a service request procedure, or for other reason than a de-registration procedure, upon fallback indication from lower layers, the UE (100) shall:

Enter 5GMM-IDLE mode;

Initiate the service request procedure further if the release request indication/release indication/Paging reject indication/leaving is not included in the registration request or service request message include the Uplink data status IE in the SERVICE REQUEST message or the CONTROL PLANE SERVICE REQUEST message indicating the PDU session(s) for which user-plane resources were active prior to receiving the fallback indication, if any.

If the procedure that triggered the request to the lower layers to transition to RRC_CONNECTED state is the UE-initiated NAS transport procedure and the UE (100) had SMS, location services message, or CIoT user data to send, the UE (100) shall also include the SMS, location services message, or CIoT user data in the CONTROL PLANE SERVICE REQUEST message; and Upon successful service request procedure completion, proceed with any pending procedure.

If the UE (100) in the 5GMM-CONNECTED mode with RRC inactive indication receives the fallback indication from the lower layers, and the UE (100) has pending uplink user data for PDU session(s) with user-plane resources already established but no pending NAS procedure, the UE (100) shall:

Enter 5GMM-IDLE mode; and

Initiate the service request procedure further if the release request indication/release indication/Paging reject indication/leaving is not included in the registration request message then include the Uplink data status IE in the SERVICE REQUEST message or the CONTROL PLANE SERVICE REQUEST message indicating the PDU session(s) for which user-plane resources were active prior to receiving the fallback indication.

If the UE (100) in the 5GMM-CONNECTED mode with RRC inactive indication receives an indication from the lower layers that the resumption of the RRC connection has failed, and:

If the lower layers indicate that access barring is applicable for all access categories except categories 0 and 2, the UE (100) shall:

Stay in 5GMM-CONNECTED mode with RRC inactive indication;

else, the UE (100) shall:

Enter 5GMM-IDLE mode; and

Initiate the registration procedure for mobility and periodic registration update used for mobility (i.e., the 5GS registration type IE set to "mobility registration updating" in the REGISTRATION REQUEST message) for N1 NAS signalling connection recovery.

The indication from the lower layer that the RRC connection has been released with cause "RRC resume failure" can be considered as an indication that the resumption of the RRC connection has failed.

In this embodiment, either service request or registration request message term is used interchangeable it should be considered generally as any NAS message for this patent disclosure.

Various embodiments herein have been described using a NAS message as an example of a service request message (with release request indication flag or release indication flag), but it may be obvious to a person of ordinary skill in that the embodiments disclosed herein may be applicable to scenarios, where the UE (100) has initiated service request message without release request flag.

Various embodiments herein have been described using a NAS message as an example of a service request message, but it may be obvious to a person of ordinary skill in that the embodiments disclosed herein may be applicable to other UE (100) initiated NAS procedures too unless explicitly mentioned for any particular NAS message name.

Various embodiments herein have been from the perspective of 5GS, but it may be obvious to a person of ordinary skill in that the embodiments disclosed herein may be applicable to scenarios, where the equally applicable for Evolved Packet System (EPS) case, the core network node can be a Mobility Management Entity (MME) instead of AMF entity (300).

Various embodiments disclosed herein are equally applicable to both the 5GS and 4GS, wherein the respective RAN nodes to be used is eNB for EPS/4GS NG-eNB/gNB for NR/5GS.

Figure 4:
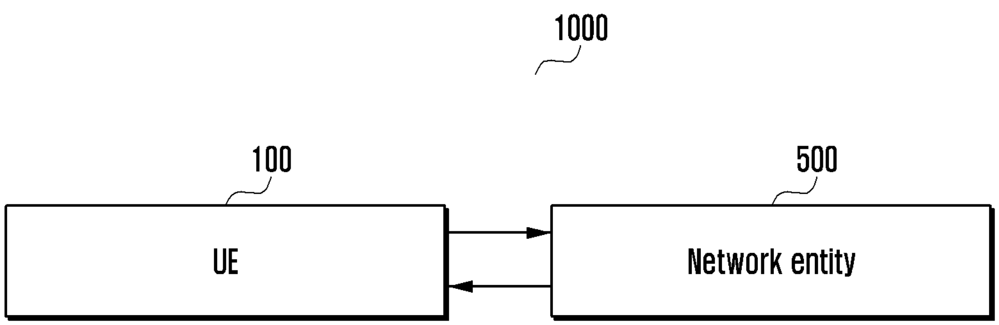
FIG. 4 is an overview of a wireless network for performing a PDU session recovery in a RRC inactive state of a UE, according to embodiments as disclosed herein.

FIG. 4 is an overview of the wireless network (1000) for performing the PDU session recovery in the RRC inactive state of the UE (100), according to embodiments as disclosed herein. In an embodiment, the wireless network (1000) includes the UE (100) and a network entity (500). The network entity (500) can be, for example, but not limited to the gNB (200) and the AMF entity (300). The wireless network (1000) can be, for example, but not limited to 4G network, a 5G network, 6G network, an open radio access network (ORAN) network or the like. The UE (100) can be, for example, but not limited to a laptop, a desktop computer, a notebook, a Device-to-Device (D2D) device, a vehicle to everything (V2X) device, a smartphone, a foldable phone, a smart TV, a tablet, an immersive device, and an internet of things (IOT) device.

The UE (100) initiates the NAS message in the RRC inactive state of the UE (100) and receives the fallback indication from the lower layer (e.g., access stratum (AS) layer or the like). The fallback indication is received from the lower layer, when the resume procedure of the UE (100) is not successful with the network entity (500). The indication can be, for example, but not limited to a release request indication, a release indication, a paging reject indication and the UE request type information element (IE) with Request type value set to "NAS signalling connection release".

Further, the UE (100) determines whether the UE (100) includes the indication in the NAS message. In an embodiment, upon determining that the UE (100) does not include the indication in the NAS message, the UE (100) initiates recovery of the PDU session for which the at least one user-plane resource was active prior to receiving the fallback indication. In another embodiment, the UE (100) forbids to initiate recovery of the PDU session for which the at least one user-plane resource was active prior to receiving the fallback indication upon determining that the UE (100) includes the indication in the NAS message. The recovery of the PDU session is initiated by performing a NAS procedure with uplink data status IE indicating the at least one PDU session for which at least one user-plane resource was active prior to receiving the fallback indication.

Figure 5:
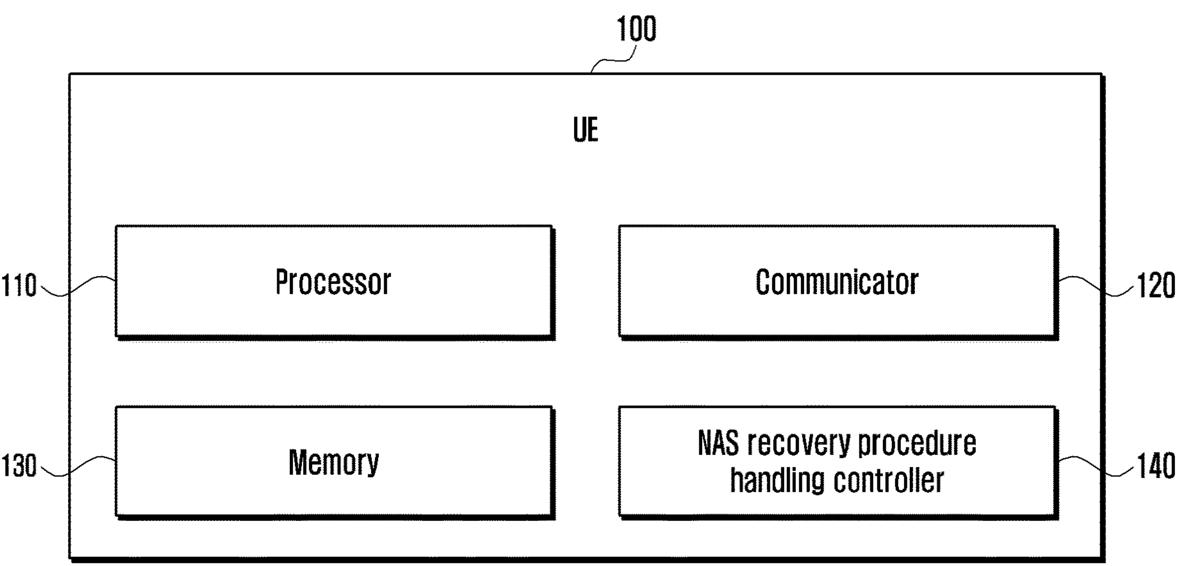
FIG. 5 shows various hardware components of the UE for performing the PDU session recovery in the RRC inactive state of the UE, according to embodiments as disclosed herein.

FIG. 5 shows various hardware components of the UE (100) for performing PDU session recovery in the RRC inactive state of the UE (100), according to embodiments as disclosed herein. In an embodiment, the UE (100) includes a processor (110), a communicator (120), a memory (130), and a NAS recovery procedure handling controller (140). The processor (110) is coupled with the communicator (120), the memory (130), and the NAS recovery procedure handling controller (140).

The NAS recovery procedure handling controller (140) is configured to initiate the NAS message in the RRC inactive state of the UE (100) and receive the fallback indication from the lower layer. Further, the NAS recovery procedure handling controller (140) is configured to determine whether the UE (100) includes the indication in the NAS message. Upon determining that the UE (100) does not include the indication in the NAS message, the NAS recovery procedure handling controller (140) is configured to initiate recovery of the PDU session for which at least one user-plane resource was active prior to receiving the fallback indication. Upon determining that the UE (100) includes the indication in the NAS message, the NAS recovery procedure handling controller (140) is configured to forbid to initiate recovery of the PDU session for which at least one user-plane resource was active prior to receiving the fallback indication.

The NAS recovery procedure handling controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5 shows various hardware components of the UE (100) but it is to be understood that other embodiments are not limited thereon. In other embodiments, the electronic device UE (100) may include less or more number of components. Further, the labels or names of the components are used only for illustrative purpose and does not limit the scope of the invention. One or more components can be combined together to perform same or substantially similar function in the UE (100).

Figure 6:
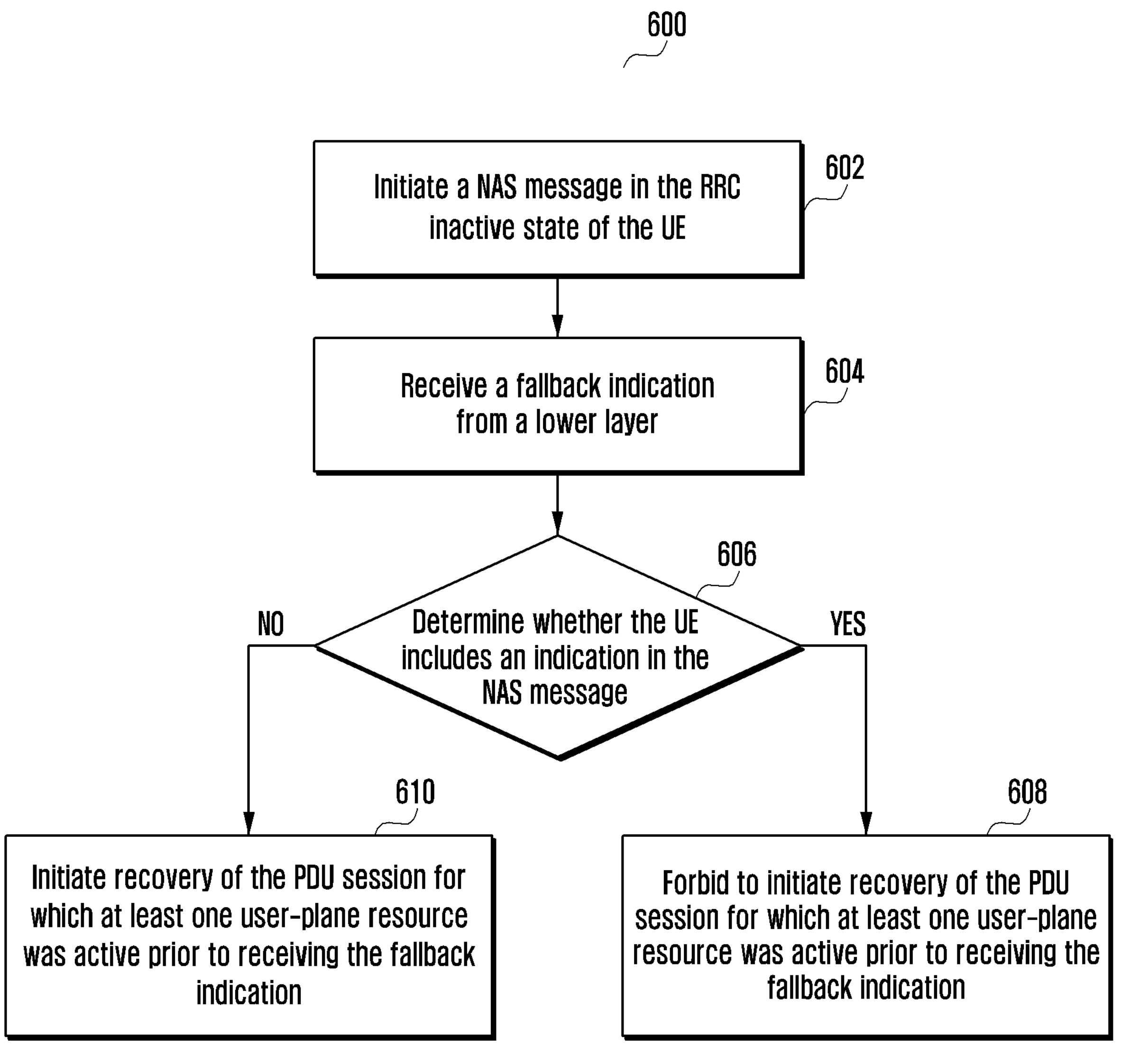
FIG. 6 is flow chart illustrating a method for performing the PDU session recovery in the RRC inactive state of the UE, according to embodiments as disclosed herein.

FIG. 6 is flow chart (600) illustrating a method for performing PDU session recovery in the RRC inactive state of the UE (100), according to embodiments as disclosed herein. The operations (602-610) are performed by the NAS recovery procedure handling controller (140).

At 602, the method includes initiating the NAS message in the RRC inactive state of the UE (100). At 604, the method includes receiving the fallback indication from the lower layer. At 606, the method includes determining whether the UE (100) includes the indication in the NAS message. At 608, the method includes forbidding to initiate recovery of the PDU session for which the at least one user-plane resource was active prior to receiving the fallback indication upon determining that the UE (100) includes the indication in the NAS message. At 610, the method includes initiating recovery of the PDU session for which at least one user-plane resource was active prior to receiving the fallback indication upon determining that the UE (100) does not include the indication in the NAS message.

The various actions, acts, blocks, steps, or the like in the flow chart (600) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a user equipment (UE) in a wireless communication system, the method comprising:

requesting a lower layer to transition to a radio resource control (RRC) connected state;

obtaining a fallback indication from the lower layer;

proceeding with a pending procedure;

determining whether the pending procedure is a service request procedure or a registration request procedure, and whether a request message associated with the service request procedure or the registration request procedure includes release request information; and if the pending procedure is the service request procedure or the registration request procedure, and the request message does not include the release request information, including an uplink data status information element (IE) in the request message, wherein the uplink data status IE indicates a protocol data unit (PDU) session for which user-plane resources were active prior to receiving the fallback indication.

2. The method of claim 1, further comprising:

sending, to an access and mobility management (AMF), the request message.

3. The method of claim 1, further comprising:

entering $5^{th}$ generation system mobility management (5GMM) idle mode as a response to obtaining the fallback indication.

4. The method of claim 1, wherein the pending procedure is the service request procedure and the request message is a service request message.

5. The method of claim 1, wherein the UE is a multi-universal subscriber identity module (MUSIM) UE.

6. The method of claim 1, wherein the pending procedure is the registration request procedure and the request message is a registration request message.

7. A user equipment (UE) in a wireless communication system, the UE comprising:

a processor;

a memory; and a controller coupled with the processor and the memory, configured to:

request a lower layer to transition to a radio resource control (RRC) connected state, obtain a fallback indication from the lower layer, proceed with a pending procedure, determine whether the pending procedure is a service request procedure or a registration request procedure, and whether a request message associated with the service request procedure or the registration request procedure includes release request information, and if the pending procedure is the service request procedure or the registration request procedure, and the request message does not include the release request information, include an uplink data status information element (IE) in the request message, wherein the uplink data status IE indicates a protocol data unit (PDU) session for which user-plane resources were active prior to receiving the fallback indication.

8. The UE of claim 7, wherein the controller is further configured to:

send, to an access and mobility management (AMF), the request message.

9. The UE of claim 7, wherein the controller is further configured to:

enter $5^{th}$ generation system mobility management (5GMM) idle mode as a response to obtaining the fallback indication.

10. The UE of claim 7, wherein the pending procedure is the service request procedure and the request message is a service request message.

11. The UE of claim 7, wherein the UE is a multi-universal subscriber identity module (MUSIM) UE.

12. The UE of claim 7, wherein the pending procedure is the registration request procedure and the request message is a registration request message.

* * * * *